United States Patent [19]
Baird et al.

[11] 3,853,549
[45] Dec. 10, 1974

[54] HIGH ENERGY ABSORPTION-POROUS BERYLLIUM MADE BY PLASMA CONSOLIDATION

[75] Inventors: Robert J. Baird; Thomas A. Taylor, both of Indianapolis, Ind.

[73] Assignee: Union Carbide Corporation, New York, N.Y.

[22] Filed: Apr. 28, 1972

[21] Appl. No.: 248,652

[52] U.S. Cl.................. 75/208 R, 29/182, 75/200, 75/213, 75/225, 75/227, 117/22, 117/105, 117/105.2, 117/119.2
[51] Int. Cl. ........ B22f 3/10, C22c 1/08, B22f 3/24, C23c 7/00, C22c 25/00
[58] Field of Search.......... 75/200, 208 R, 227, 211, 75/225, 213; 29/182, 182.3; 117/105, 105.2, 105.1, 22, 119.2

[56] References Cited
UNITED STATES PATENTS
2,966,423  12/1960  Shichman .......................... 117/105

OTHER PUBLICATIONS

Stetson et al. Plasma Spraying Techniques for Toxic and Oxidizable Materials, in the journal of Metals, 13(7): p. 479–482, July, 1961. Tn1J6

Beaver et al. Mechanical Properties of Beryllium Fabricated by Powder Metallurgy, in Journal of Metals. 6(5): p. 1–15, May, 1954.

*Primary Examiner*—Carl D. Quarforth
*Assistant Examiner*—R. E. Schafer
*Attorney, Agent, or Firm*—Dominic J. Terminello

[57]          ABSTRACT

A high purity as-coated plasma-consolidated beryllium material is subjected to a heat treatment whereupon it is densified by at least 0.04 grams/cm$^3$ to produce a porous beryllium material having excellent energy absorption characteristics.

11 Claims, 3 Drawing Figures

HIGH ENERGY ABSORPTION-POROUS BERYLLIUM MADE BY PLASMA CONSOLIDATION

FIELD OF THE INVENTION

This invention relates to a high energy absorption-porous beryllium material and the process for producing it. Specifically, high-purity plasma-deposited beryllium, having a density greater than 75 percent theoretical, is heat treated to cause a density increase of at least about 0.04 grams/cm$^3$ to produce a porous beryllium product having high energy absorption characteristics.

DESCRIPTION OF THE PRIOR ART

Beryllium offers a combination of low density and high strength which make it a desirable product for use as an aerospace structural material. In addition, its thermal property makes it attractive as a heat sink and thus qualifies it for use as a skin covering for aerodynamical vehicles. The large thin-wall shapes required for aerodynamic applications are difficult to fabricate and are quite expensive to produce. It is common practice to first hot-press beryllium powder into a large block of beryllium and then machine it to provide a desired smaller-shaped article. The expense incurred in the machining operation plus the waste of the scraps therefrom results in an expensive end product. Another method of fabricating shaped beryllium articles is to first produce beryllium sheets and then form the sheets to the particular shape desired. This method of fabrication not only produces an unattractive article but also an expensive one since the sheets usually have to be joined thereby requiring an additional costly operational step.

A significant advancement in the fabrication of unitary thin-wall beryllium shapes has recently been devised by using the plasma arc-torch coating technique described in U.S. Pat. Nos. 2,858,411 and 3,016,447. Basically, plasma arc coating is a method for continually depositing a powder coating material on the surface of a workpiece. An electric arc between a nonconsumable stick electrode and a spaced apart second electrode is provided whereupon a stream of gas is then passed in contact with the stick electrode to be contained therein thus forming an arc-containing gas stream. A portion of the gas stream is wall-stabilized so as to collimate the energy of the arc thus providing a high thermal content effluent. Coating material, such as beryllium in the powder form, is them passed into the stream whereupon the heat of the high thermal content effluent melts and propels the coating material onto the workpiece thereby resulting in an evenly applied, fine grain size coating on the workpiece. This coating process is continued until a uniform layer of the precise thickness is deposited on the workpiece. Thus various shapes can be fabricated quickly and economically. The drawback with this fabrication tecnique, however, is that it results in a plasma-consolidated end product having less than full theoretical density and relatively poor mechanical properties thus limiting its use to applications where density and strength are not critical.

In our copending application, Ser. No. 076,258, titled "Process for Heat Treating Plasma-Consolidated Beryllium"now U.S. Pat. No. 3,791,851, issued Feb. 12, 1974, a three-stage process for heat treating plasma-consolidated beryllium to produce highly densified beryllium having a theoretical density greater than 99 percent, is disclosed. This heat treated beryllium exhibits increased strength and ductility over as-deposited beryllium enables complex shaped articles of beryllium to be fabricated for use by industry.

The present invention is directed to a process for producing a porous beryllium material having excellent energy absorption characteristics.

SUMMARY OF THE INVENTION

The present invention is directed to a high energy absorption-porous beryllium material and the process for producing it.

Specifically, an as-coated plasma-deposited beryllium material is prepared using highly purified beryllium powder so that the as-coated beryllium will have an impurity-property function (IPF) of about 25,000 or less, as defined by the equation:

$$IPF = 10.Al + 40.Si + 5.Mg + 0.5.(O+C),$$

where Al, Si, Mg, O and C are the parts per million by weight of aluminum, silicon, magnesium, oxygen and carbon in the plasma-deposited beryllium; along with less than about 1 percent by weight of other metallic impurities. The as-coated beryllium material must also have a theoretical density between about 75 and about 97 percent, preferably between about 80 and about 90 percent, as based on a 100 percent theoretical density as determined by the procedure of ASTM B328-60 (1970 Annual Book of ASTM Standards, Part 7 p. 344, ASTM, Philadelphia), and corrected for BeO content according to the formula:

Theoretical Density
$$= \frac{100}{\frac{100 - \text{percent BeO}}{1.847} + \frac{\text{percent BeO}}{3.009}} \quad (\text{grams/cm}^3).$$

The as-coated beryllium material may be heated to a temperature below its densification temperature for a time period sufficient to substantially outgas and thermally desorb the gases and condensed gases occupying the pores and pore surfaces of the material, respectively, so as to minimize oxidation and other undesirable chamical reactions which could occur during densification. The beryllium material is then densified at a temperature and for a time period sufficient to increase the density of the material by at least about 0.04 grams/cm$^3$ (about 2percent of the theoretical) up to about 99 percent theoretical, after which it is cooled to ambient temperature. When the impurity content of the beryllium material is relatively high, but lower than about 25,000 IPF, then it may be desirable to cool it after densification at a rate sufficient to react the beryllium with at least one of its impurities to form an intermetallic compound so that said impurity will not adversely affect the mechanical properties of the article at room temperature. By selecting the densification temperature and time period for the process of this invention, a beryllium material can be produced which will have an absorbed energy value greater than 150, preferably 200, inch-lb/inch$^3$, such absorbed energy value being the graphically integrated area under a stress-strain curve plotted for a beryllium material until fracture has occurred as shown by the shaded area in FIG. 1 on data contained in Example 2. An excellent high energy absorption-porous beryllium material can thus be produced by plasma-depositing high purity beryllium powders to form a beryllium body or the like which is then subjected to a controlled heat treatment for increasing its density by at least 0.04 grams/cm$^3$. The excellent absorption characteristic coupled to the excellent properties of beryllium will make beryllium articles made according to this invention admirably suited for various applications in serveral industries.

purities like oxygen have a greater concentration in the finer powder than in the larger size powder. For example, three different powder lots were analyzed and found to contain the impurities shown in Table 1 below. Thus to minimize impurity content, such as oxygen, in the powder, a larger size powder may be desired although a powder size of 325 Tyler mesh and finer can be used effectively and efficiently in the coating process.

TABLE 1

|  | 60 to 100 Tyler Mesh Size | 100 to 270 Tyler Mesh Size | 270 to 325 Tyler Mesh Size |
|---|---|---|---|
| % Be | 99.5 | 99.0 | 99.3 |
| BeO | 0.3 | 0.5 | 0.7 |
| Al | 0.06 | 0.03 | 0.04 |
| C | 0.11 | 0.07 | 0.07 |
| Fe | 0.07 | 0.06 | 0.07 |
| Mg | 0.04 | 0.04 | 0.04 |
| Si | 0.03 | 0.03 | 0.02 |
| All other impuriites | less than 0.04 | less than 0.04 | less than 0.04 |

In calculating the impurity-property function (IPF), the impurity values should be determined from the plasma-sprayed beryllium body and not the powder used to produce it. However, studies have shown that only the oxygen content is measurably changed from its concentration in the starting powder during normal plasma spraying, and therefore, it would be satisfactory to calculate the IPF using the impurity analysis of the powder for all the elements except oxygen, which should be analyzed in the plasma-deposited body. Since it is the impurity elements present in the as-sprayed beryllium body prior to the heat treatment that are important to the IPF function, then any other elements that may be added prior to the heat treatment, such as from liquid- or gas-phase impregnation of the material, must be included in the IPF calculation.

The specific size of the beryllium powder to be used in the plasma arc-torch process to prepare a beryllium body is somewhat important since the coating efficiency of the process and the body's mechanical properties of strength and ductility are somewhat dependent upon the powder size of the coating material, i.e., powder size between 10 microns and 50 microns will provide optimum coating efficiency and higher mechanical properties for the coated article. From experimentation it has been found that a powder size of 325 Tyler mesh (44 microns) and finer provides a good efficient coating process while yielding a consolidated layer of beryllium having good mechanical properties. However, with the design of larger powered arc torches than are commercially available today, it may be possible to increase the size of the beryllium powder to be used since a larger size arc would produce more heat which could effectively melt larger size powder particles prior to propelling them onto the workpiece. Another important factor in considering powder size is that certain im- The amount of impurities in the powder other than the impurities listed in IPF equation I cannot exceed 1 percent of the powder by weight. Thus, although a IPE value under 25,000 is calculated, a determination of the other metallic impurities in an as-sprayed, beryllium body will hve to be made before subjecting it to the heat treatment of this invention.

Another variation in an as-coated plasma consolidated beryllium body to be evaluated in the density of the body with reference to a 100 percent theoretical density corrected for BeO content according to the formula:

$$\text{Theoretical Density} = \frac{100}{\frac{100-\text{percent BeO}}{1.847} + \frac{\text{percent BeO}}{3.009}} \ (\text{grams/cm}^3).$$

Generally densities between 78 and 93 percent theoretical have been found in as-coated beryllium samples, although density between 75 and 97 percent theoretical are believed to be obtainable under controlled conditions. For the purpose of this invention an as-coated beryllium material having a density between about 75 and about 97 percent theoretical, preferably between about 80 and about 90 percent, would be required to produce a densified beryllium material having a density between about 77 and about 99 percent theoretical.

By selecting beryllium powder to meet the requirement of the IPF equation of under about 25,000, and having other metallic impurities of not more than 1 percent by weight, a plasma arc torch can be used to produce a plasma deposited beryllium body having a density within the range specified above.

Figure 3:
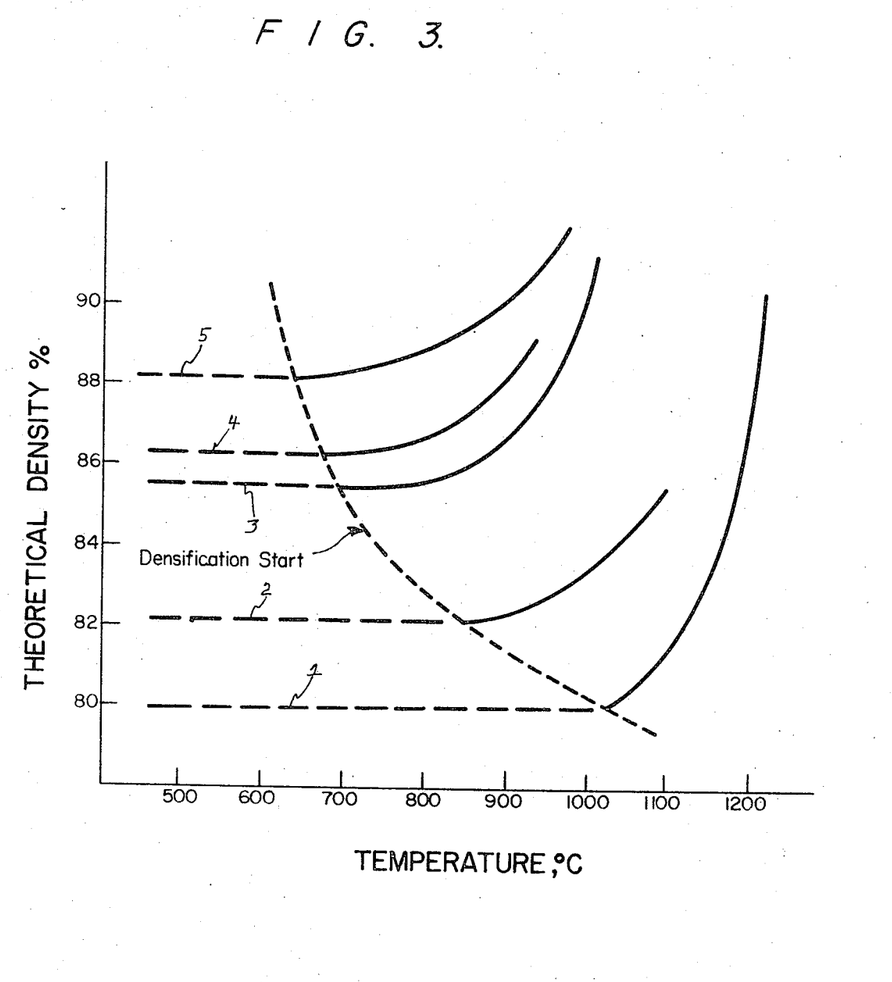
FIG. 3 — Density of As-Deposited Beryllium vs. Temperature plot showing the temperature at which the densification of as-deposited beryllium starts.

When undesirable chemical reactions are to be minimized during the densification of the beryllium, then the first stage of the heat treating process according to this invention may be initiated by placing an as-coated plasma-consolidated beryllium article having a theoretical density between about 75 and about 97 percent into a substantial vacuum and controllably heating the article to outgas and/or thermally desorb the contaminants occupying the pore and pore surfaces of the article, such as gases and condensed gases, respectively. The source of some of these contaminants can be attributed to normal air (nitrogen and oxygen), arc-torch gas (mainly argon), substrate coolant (mainly $CO_2$) and adsorbed moisture ($H_2O$) since these contaminants are usually present in all plasma-consolidated coatings. The article, during this ougassing desorption stage, can be heated at a rate and for a time period necessary to reduce the typical as-coated adsorbed gas level of approximately $10^{-3}$ moles per cubic centimeter of porosity, or void, to at least $10^{-4}$ moles per cubic centimeter of porosity, and preferably to $10^{-5}$ moles per cubic centimeter of porosity. However, the temperature should remain below the temperature where the internal porosity is closed off from the surface through evaporation-condensation and densification shrinkage mechanisms. This upper temperature level referred to as the sintering or densification-start temperature, is a function of the density of the as-coated beryllium article and can be as low as 600°C for as-coated articles having a 90 percent theoretical density, whereas an as-coated article having an 85 percent theoretical density requires a temperature of about 700°C to commence internal porosity closure. Generally this outgassing desorption stage, if used, can be successfully implemented by placing the body in a vacuum of less than $10^{-5}$ torr and then subjecting it to a time-temperature heating profile of less than 10°C per minute and preferably about 4°C per minute. Another heating procedure is to rapidly heat the body in a substantial vacuum to about 500°C and then holding thereat for at least 30 minutes to insure that the level of contaminants has decreased to a tolerable level of less than $10^{-4}$ moles per cubic centimeter of porosity. An artisan can easily determine the exact temperature and holding period for this initial step of the heat treatment once the starting density of the as-deposited beryllium body is known since the temperature at which densification starts for an as-deposited beryllium article or body is a function of its as-deposited density. The temperature at which densification or sinterability started for five as-coated beryllium specimens, 1 through 5, having different as-coated densities, is shown in FIG. 3. The as-coated density of the specimens 1 through 5, are the points of intersection of the broken lines, representing the specimens 1 through 5, respectively, on the theoretical density axis (vertical). The same powder composition, having an IPF of 28,930, was used to produce the five specimens except that the as-coated density of each was different, ranging from a low of 80 percent theoretical (specimen 1) to a high of 88.3 percent theoretical (specimen 5). As illustrated in FIG. 3, densification starts below 650°C for as coated beryllium specimen 5 having an 88.3 percent theoretical density, and higher than 1000°C for as-coated beryllium specimen 1 having a theoretical density of 80 percent. The density of each specimen did not increase below its densification-start temperature as evidenced by the broken line shown in FIG. 3 for each specimen, but once the densification-start temperature was reached, the density of each specimen increased according to the solid curve shown in FIG. 3 during a 2 hour sinter. Thus the exact temperature required for sintering and densification can be determined once the as-coated density is known. However, the degree of densification will also be a function of the impurity content in the as-coated beryllium so that the temperature during the holding period will vary depending on the impurity content along with what density value is desired in the final product for a particular end use application. As stated above, this initial heating step may not be necessary in some applications since the beryllium material is not being densified to 100 percent theoretical and since the powder used for preparing the plasma-deposited material is highly purified. However, for most applications, this initial heating step is preferable.

The substantially outgassed aritcle, or an as-coated beryllium article, is densified by being subjected to a heating treatment whereby the temperature is increased to above a level where densification of the article will start, such temperature being the sintering temperature which, among other factors, is a function of the impurity content in the beryllium. The article is then held at this temperature until a density increase (DF) of at least about 0.04 grams/cm³ has occurred. In some applications, the time period for maintaining the article in this high temperature environment should be somewhat limited since prolonged exposure to the high temperature may increase the grain size of the body and thereby decrease its mechanical properties. In general, heating the article to a temperature between at least 650° and about 1250°C for a period of between about 30 minutes and about 4 hours, will be sufficient to successfully increase the density by about 0.04 grams/cm³ or greater without substantially increasing the grain size of the body. Preferably heating the article to between about 900° and about 1250° C for a period between about 1 hour and about 2 hours will be sufficient to increase the density of a beryllium article based on the initial as-coated beryllium body having a density between about 80°percent and about 90 percent theoretical. This densification stage of the process should be carried out in an enclosed heated zone slightly larger than the beryllium article so as to minimize the overall evaporation loss of the beryllium. The exact ratio of volume of the heated zone to surface area of the article is not critical to the process but a ratio of not greater than 1.0 inch is preferred.

Figure 2:
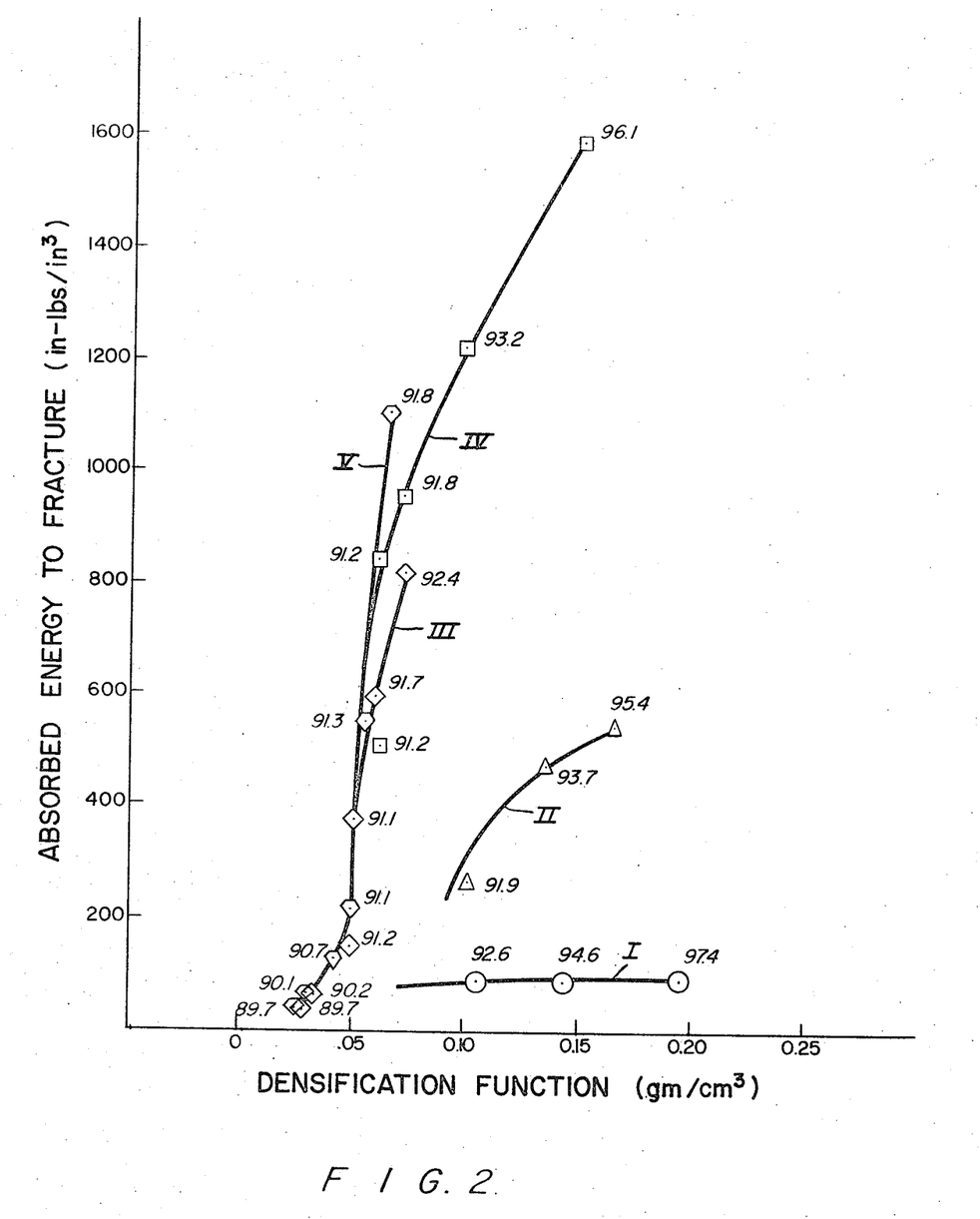
FIG. 2 — An Absorbed Energy to Fracture vs. Densification Function plot for several beryllium specimens made according to this invention.

The minimum value of the densification function (DF) of 0.04 grams/cm³ can best be illustrated by use of FIG. 2 which shows a graph of average Absorbed Energy to Fracture value vs. average DF value for several plasma-deposited sintered beryllium powders. The data for the curves of this graph are contained in the examples hereinafter set forth. As shown in the graph of FIG. 2, an average DF of less than 0.04 grams/cm³ for various plasma-deposited sintered beryllium materials, had apparently negligible effect in increasing the absorbed energy to fracture value for the materials. However, an average DF of 0.04 grams/cm³ or higher, greatly increased the absorbed energy to fracture value of the materials having an IPF of less than about 25,000 as represented by curves II through V. The plasma-deposited sintered beryllium materials that have an as-deposited IPF of 28,930, Curve I, could not obtain an absorbed energy to fracture value of greater then 95 regardless of their degree of densification as shown in FIG. 2. The DF requirement of at least about 0.04 grams/cm³ is evident from this experimental data. Thus the requirements of a maximum IPF, as can be interpolated from FIG. 2 as 25,000, coupled to a minimum DF of 0.04 grams/cm³, are essential to produce a beryllium article having an absorbed energy to fracture value of at least 150 which is required for good absorption characteristics.

When the impurity content of the as-sprayed beryllium article is relatively high, but less than about 25,000 IPF, then a final step of the heat treating process may be performed whereby the densified porous beryllium article is controllably cooled at a rate sufficient to control the impurity distribution within the article by solution and/or precipitation reactions to produce a strong and ductile beryllium article. Commercially available beryllium is actually a multi-phase alloy since impurities contained therein, such as aluminum and silicon, have extremely low solubility and are forced to reside mainly at the grain boundaries. For example, at temperatures within the range of 400° to 700°C, aluminum and silicon eutectics with beryllium can form thereby resulting in loss of ductility to the article. However, aluminum can react with the impurity iron and beryllium to form a refractive intermetallic which can avoid any loss of ductility to the article. Thus a time-temperature cooling profile following the densification stage of the process may be required to produce and distribute within the body at least one of the beryllium compounds in the group consisting of $AlFeBe_4$, $AlFeBe_5$, $FeBe_{11}$, $FeBe_{12}$ and similar compounds with substitution of silicon and other transition metal elements, so that the physical properties of the body will not be substantially reduced. For example, by reacting free aluminum or silicon with iron and beryllium to form compounds of the general type $AlFeBe_4$, we can avoid having free aluminum and silicon at the grain boundaries where they could decrease the ductility of the beryllium body. As stated above, this controlled cooling stage of the heat treatment may not be necessary since the highly purified beryllium powder is required to be used in fabricating an as-sprayed beryllium article according to this invention.

When a controlled cooling stage is employed, a cooling rate of between about 1° and about 10°C per minute would be sufficient to substantially control the impurity distribution within the beryllium body to produce a very desirable finished product. Preferably a cooling rate of between about 1.5° and about 2°C per minute is desirable. It is also possible to rapidly cool down the body to a temperature between about 500° and about 750°C and then age or hold the body thereat for a period of at least 10 hours to produce the desired solution and/or precipitation reactions.

Where it is required that there be no extraordinary ductility loss at temperatures of about 500°C, than an additional aging step will become necessary whereby the article is maintained, after being controllably cooled as specified above, at a temperature of between about 500° and about 750°C for a time period about 10 hours and about 100 hours.

The exact time-temperature profile of the heat treating process of this invention to be used for any particular shaped article depends on the initial properties of the as-coated plasma-consolidated berylliuma article including its impurity contents. In addition, the temperature range and time duration for each stage of this process will also be a function of the properties desired in the finished product which is usually dictated by its intended applicational use.

EXAMPLE 1

High purity beryllium powder, the chemical analysis of which is shown in Table 2, was plasma sprayed onto four aluminum cylindrical shells measuring 3 inches I.D. × 6 inches long using an arc torch operating under the parameters shown in Table 3. The as-coated shells, with a beryllium layer of 0.15 inch thick were cut longitudinally into ½ inch wide strips. The strips readily released from the aluminum shell substrate and no contamination of the beryllium occurred. From each cylinder some 16–18 strips were obtained and the density, as measured, is shown in Table 4. The properties of the segments as hereinafter used, will mean the average properties of two or more strips, i.e., the properties of segment 1 of specimen 1 are the properties of two or more strips cut from the same cylinder.

The impurity values as obtained from an analysis of the powder along with the oxygen impurity which was obtained from an analysis of the as-coated beryllium strips were used in the formula of equation 1 to determine the impurity property function, which was calculated to be 8,530. As-deposited beryllium strips from each of the specimens 1 through 4, representing cylinders 1 through 4, respectively, were vacuum heat treated in a resistance heated furnace over a variable range of temperature as shown in Table 4. For example, four segments from specimen 1 were sintered at different temperatures, ranging from 1180° to 1250°C, as shown in Table 4. In each case, the heating rate was 4°C per minute to the sintering temperature whereupon the segments of the specimens were held at such temperature for 2 hours, after which they were cooled at a rate of 2°C per minute. The vacuum was typically $10^{-5}$ mm Hg until reaching 800°C, at which time a pressure of 100 microns of argon was admitted to the furnace chamber. This pressure was continued for the remainder of the heat treatment cycle. The density of the as-coated sintered beryllium segments was measured and is shown in Table 4. The densification function of each segment was calculated using the as-coated density and the as-coated sintered density of the segments, and the results are shown in Table 4. An ASTM E-8 subsize sheet specimen, gage section measuring 1 inch × ¼ inch, for each of the segments was prepared in accordance with the standards as described in the 1971 Annual Book of ASTM Standards Part 31, page 194, ASTM, Philadelphia. The absorbed energy to fracture value for each of the sub-size specimens was measured using a Tinius-Olsen S-1000A extensometer and a Tinius-Olsen 20,000 pound Electromatic Tensile Machine. The tensile strain rate employed at room temperature in the testing was 0.016 inch per inch per minute. With the use of these testing machines, a typical stress-strain curve could be plotted and the area under such curve could be graphically integrated to provide the absorbed energy to fracture value. The value so obtained for each segment of the sample specimens is shown in Table 4. The data obtained from specimen 4 was used to plot curve V of FIG. 2, such curve containing the points within the pentagon configurations.

As illustrated in this Table 4, the sintering temperature is variable and is dependent upon the as-coated density of the beryllium material. For example, segment 1 of specimen 1, although having an IPF of less than 25,000 and a DF of more than 0.04 grams/cm³, did not yield a sintered beryllium material having an absorbed energy to fracture of more than 150. Thus for this low density as-coated beryllium specimen, the sintering temperature has to be increased to produce in absorbed energy to fracture greater than about 150 as shown by the test segments 3 and 4 of specimen 1. Thus for beryllium originally deposited at lower densities (e.g., 80–82 percent theoretical as shown for specimens 1 and 2), the minimum heat treatment required would have to be somewhat greater to produce a product having an absorbed energy to fracture of 150, than beryllium deposited at higher densities (e.g., greater than 84 percent theoretical as shown for specimens 3 and 4).

TABLE 2

| | |
|---|---|
| Be | 99.38% |
| O* | 9000 ppm |
| C | 260 ppm |
| Fe | 350 ppm |
| Al | 60 ppm |
| Mg | 20 ppm |
| Si | 80 ppm |
| Ni | 210 ppm |
| Mn | 20 ppm |
| Cr | 20 ppm |
| Ca | less than 200 ppm |
| Co | less than 3 ppm |
| Cu | less than 10 ppm |
| Zn | less than 100 ppm |
| Ag | less than 5 ppm |
| Pb | less than 3 ppm |
| Mo | less than 10 ppm |
| Ti | less than 20 ppm |

*Oxygen analysis after plasma spraying to solid form.

TABLE 3

| Specimens | 1 | 2 | 3 | 4 |
|---|---|---|---|---|
| Powder size | 44 microns and finer | 44 microns and finer | 44 microns and finer | 44 microns and finer |
| Anode type | copper | copper | copper | copper |
| Voltage of arc torch | 39–40 | 38–40 | 38 | 58–60 |
| Current of arc torch | 70–71 | 77–78 | 93–93 | 188–190 |
| Powder feed rate, gm/min | 9 | 9 | 9 | 11 |
| Carrier gas | argon-7½% $H_2$ | argon-7½% $H_2$ | argon-7½% $H_2$ | argon-5% $H_2$ |
| Carrier gas flow, cfh | 28 | 28 | 28 | 120 |
| Shroud gas | — | — | — | argon |
| Shroud gas flow, cfh | 0 | 0 | 0 | 1500 |
| Rotation speed, rpm | 1000 | 1000 | 1000 | 1000 |

TABLE 4

| | Specimen 1 | | | | Specimen 2 | | | | Specimen 3 | | | Specimen 4 | | | | | |
|---|---|---|---|---|---|---|---|---|---|---|---|---|---|---|---|---|---|
| Segments | 1 | 2 | 3 | 4 | 1 | 2 | 3 | 4 | 1 | 2 | 3 | 1 | 2 | 3 | 4 | 5 | 6 |
| As-coated density, % theoretical | 79.6 | 79.6 | 79.6 | 79.6 | 81.2 | 81.2 | 81.2 | 81.2 | 84.5 | 84.5 | 84.5 | 88.4 | 88.4 | 88.4 | 88.4 | 88.4 | 88.4 |
| Sintering temperature, °C | 1180 | 1220 | 1240 | 1250 | 1160 | 1220 | 1240 | 1250 | 1200 | 1240 | 1250 | 794 | 900 | 1004 | 1065 | 1125 | 1205 |
| Sintered density, % theoretical | 82.1 | 83.0 | 86.2 | 92.0 | 83.2 | 84.1 | 88.7 | 90.9 | 87.1 | 89.0 | 96.2 | 89.7 | 90.1 | 90.7 | 91.1 | 91.3 | 91.8 |
| DF (gm/$cm^3$) | 0.046 | 0.063 | 0.122 | 0.229 | 0.038 | 0.054 | 0.140 | 0.179 | 0.048 | 0.083 | 0.216 | 0.024 | 0.031 | 0.042 | 0.049 | 0.054 | 0.064 |
| Absorbed energy to fracture (in-lb/$in^3$) | 86 | 133 | 346 | 413 | 73 | 119 | 390 | 470 | 240 | 481 | 702 | 33 | 46 | 123 | 217 | 556 | 1098 |
| Fracture stress (ksi) | 20.7 | 24.2 | 31.0 | 36.6 | 23.1 | 25.3 | 32.6 | 37.9 | 32.6 | 36.6 | 47.1 | 22.0 | 34.1 | 46.2 | 48.3 | 49.1 | 53.8 |
| Plastic elongation (% strain) | 0.46 | 0.58 | 1.23 | 1.47 | 0.34 | 0.50 | 1.32 | 1.43 | 0.81 | 1.46 | 1.74 | 0.14 | 0.14 | 0.25 | 0.50 | 1.10 | 2.15 |

EXAMPLE 2

High purity beryllium powder, the chemical analysis of which is shown in Table 5, was plasma sprayed onto an aluminum cylindrical shell as in Example 1 using an arc torch operating under the parameters shown in Table 6. The as-coated shell, with a beryllium coating 0.15 inch thick, was cut longitudinally into ½ inch wide strips. The impurity property function was calculated as in Example 1 and found to be 7430. Also as in Example 1, the properties of the segments as hereinafter used, will mean the average properties of two or more strips heat treated at the same temperature. Using the heat treatment procedure of Example 1, the strips were sintered at different temperatures ranging from 794° to 1205°C. Likewise, subsize sheet specimens were prepared as in Example 1 and the absorbed energy to fracture value of the specimens was determined using the same instruments and conditions as recited in Example 1. The densification temperature, DF value, absorbed energy to fracture value, and other test data for each of the segments 1 through 6 are shown in Table 7. The data obtained from this test was used to plot curve III of FIG. 2, such curve containing the points within the diamond configurations.

As illustrated in Table 7, the sintering temperature is variable and is dependent upon the as-coated density of the beryllium material. For DF values of less than 0.04 grams/$cm^3$, segments 1 and 2, the absorbed energy to fracture value was found to be considerably less than 150. However, when the DF value was increased above 0.04 grams/$cm^3$, and the sintering temperature was properly selected, an absorbed energy to fracture value of 820 was obtained —see test segment 6.

Figure 1:
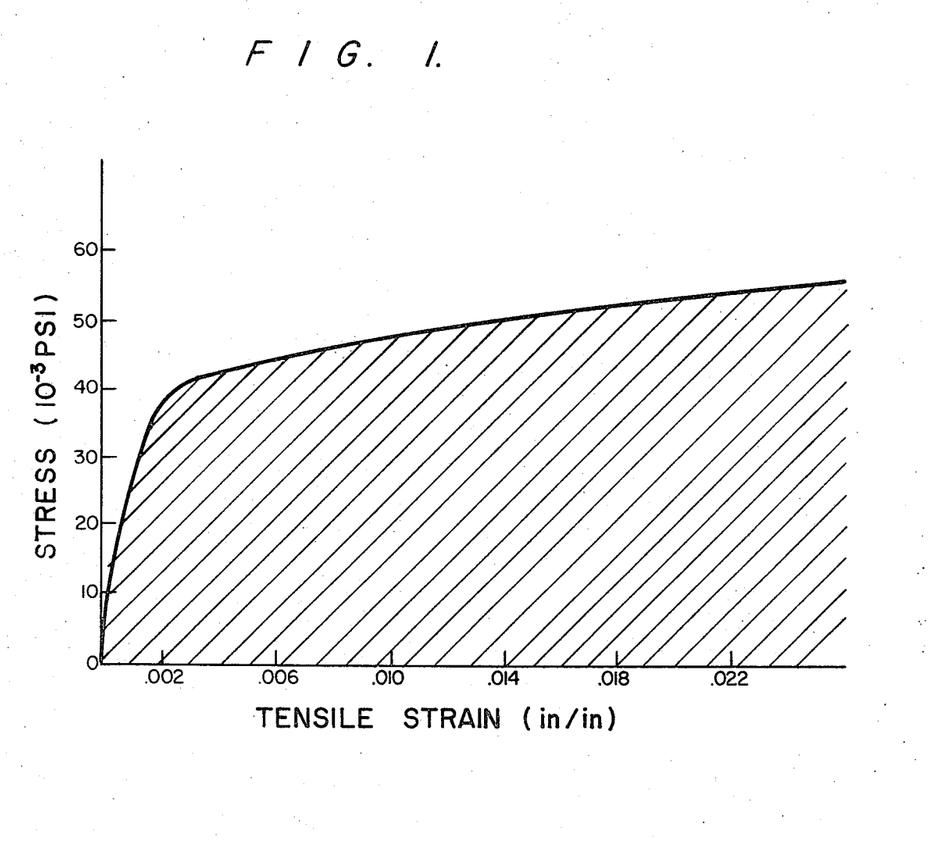
FIG. 1 — A stress-strain plot to fracture of a beryllium specimen made according to this invention.

The test data obtained from a strip from segment 6, having the properties shown in column 6' of Table 7, was used to plot the stress-stain curve of FIG. 1.

TABLE 5

| | |
|---|---|
| O* | 9000 ppm |
| C | 270 ppm |
| Fe | 250 ppm |
| Al | 210 ppm |
| Mg | 35 ppm |
| Si | 13 ppm |
| Ni | 78 ppm |
| Mn | 14 ppm |
| Cr | 13 ppm |

*Oxygen analysis of the plasma-sprayed material.

TABLE 6

| | |
|---|---|
| Anode type | copper |
| Voltage | 60 |
| Current, amps | 185 |
| Powder size | 44 microns and finer |
| Powder feed, gpm | 10.7 |
| Carrier gas | argon-5% $H_2$ |
| Carrier gas flow, cfh | 120 |
| Shroud gas | argon |
| Shroud gas flow, cfh | 1500 |
| Rotation speed, rpm | 1000 | strips heat treated at the same temperature. Using the heat treatment procedure of Example 1, the strips were sintered at different temperatures ranging from 1100° to 1240°C. Likewise, subsize sheet specimens were prepared as in Example 1 and the absorbed energy to fracture value of the specimens was determined using the same instruments and conditions as recited in Example 1. The densification temperature, DF value, absorbed energy to fracture value, and other test data for each of the segments 1 through 5 are shown in Table 10. The data obtained from this test was used to plot curve IV of FIG. 2, such curve containing the points within the squares.

As illustrated in Table 10, the selection of the proper temperature for densification of an as-coated beryllium material, can produce a sintered porous beryllium material having excellent absorption characteristics as evidenced by the large absorbed energy to fracture value of 1600 for test segment 5.

TABLE 8

| | |
|---|---|
| O* | 9600 ppm |
| C | 285 ppm |
| Fe | 325 ppm |
| Al | 75 ppm |
| Mg | 22 ppm |
| Ni | 125 ppm |
| Si | 13 ppm |

*Oxygen analysis of the plasma-sprayed material.

TABLE 7

| Segments | 1 | 2 | 3 | 4 | 5 | 6 | 6' |
|---|---|---|---|---|---|---|---|
| As-deposited density, % theoretical | 88.5 | 88.5 | 88.5 | 88.5 | 88.5 | 88.5 | 88.5 |
| Sintering temperature, °C | 794 | 900 | 1004 | 1065 | 1125 | 1205 | 1205 |
| Sintered density, % theoretical | 89.7 | 90.2 | 91.2 | 91.1 | 91.7 | 92.4 | 92.4 |
| DF, gm/cm$^3$ | 0.023 | 0.032 | 0.050 | 0.048 | 0.059 | 0.072 | 0.072 |
| Absorbed energy to fracture, in-lb/in$^3$ | 30 | 50 | 145 | 388 | 598 | 850 | 820 |
| Fracture stress (ksi) | 25.5 | 37.9 | 48.0 | 50.0 | 49.6 | 53.1 | 54.1 |
| Plastic elongation (% strain) | 0.14 | 0.12 | 0.28 | 0.83 | 1.43 | 2.18 | 2.49 |

EXAMPLE 3

High purity beryllium powder, the chemical analysis of which is shown in Table 8, was plasma sprayed onto an aluminum cylindrical shell as in Example 1 using an arc torch operating under the parameters shown in Table 9. The as-coated shell, with a beryllium coating 0.15 inch thick, was cut longitudinally into ½ inch wide strips. The impurity property function was calculated as in Example 1 and found to be 6320. Also as in Example 1, the properties of the segments as hereinafter used, will mean the average properties of two or more

TABLE 9

| | |
|---|---|
| Anode type | copper |
| Voltage | 56–58 |
| Current, amps | 180 |
| Powder size | 44 microns and finer |
| Powder feed rate, gpm | 9 |
| Carrier gas | argon-5% $H_2$ |
| Carrier gas flow, cfh | 120 |
| Shroud gas | argon |
| Shroud gas flow, cfh | 1500 |
| Rotation speed, rpm | 1200 |

TABLE 10

| Segments | 1 | 2 | 3 | 4 | 5 |
|---|---|---|---|---|---|
| As-deposited density, % theoretical | 87.9 | 87.9 | 87.9 | 87.9 | 87.9 |
| Sintering temperature, °C | 1100 | 1149 | 1184 | 1220 | 1240 |
| Sintered density, % theoretical | 91.2 | 91.2 | 91.8 | 93.2 | 96.1 |
| DF, gm/cm$^3$ | 0.061 | 0.061 | 0.072 | 0.098 | 0.152 |
| Absorbed energy to fracture, in-lb/in$^3$ | 507 | 842 | 955 | 1220 | 1600 |
| Fracture stress (ksi) | 49.9 | 52.2 | 53.4 | 56.3 | 60.4 |
| Plastic elongation (% strain) | 1.03 | 1.66 | 1.98 | 2.38 | 2.95 |

EXAMPLE 4

High purity beryllium powder, the chemical analysis of which is shown in Table 11, was plasma sprayed onto a 12-inch-diameter aluminum disc, using an arc torch operating under the parameters shown in Table 12. The as-coated 12-inch-diameter disc, with a beryllium coating 0.3 inch thick, was cut into ½ inch × 4 inch strips and the coating thickness was reduced to 0.1 inch. The impurity property function was calculated as in Example 1 and found to be 28,930. As in Example 1, the properties of the segments as hereinafter used, will mean the average properties of two or more strips heat treated at the same temperature. Using the heat treatment procedure of Example 1, the strips were sintered at different temperatures ranging from 1100° to 1200°C. Likewise, subsize sheet specimens were preparaed as in Example 1 and the absorbed energy to fracture value of the specimens was determined using the same instruments and conditions as recited in Example 1. The densification temperature, DF value, absorbed energy to fracture value, and other test data for each of the segments 1 through 3 are shown in Table 13. The data obtained from this test was used to plot curve 1 of FIG. 2, such curve containing the points within the circles.

As illustrated in Table 13, the absorbed energy to fracture value of the segments 1 through 3, although densified at temperatures between 1100° and 1200°C, could not exceed 95 regardless of the densification increase imparted to the segments. The failure to achieve an absorbed energy to fracture value above about 150 for the beryllium segments of this test is due to the large IPF value of 28,930 of the as-coated beryllium material, such value exceeding the maximum allowable IPF value of 25,000 which requirement is necessary in order to produce a porous beryllium material having good absorption characteristics according to this invention.

TABLE 11

| | |
|---|---|
| O* | 15,300 ppm |
| C | 460 ppm |
| Fe | 950 ppm |
| Al | 200 ppm |
| Mg | 450 ppm |
| Si | 420 ppm |

*Oxygen analysis of actual plasma-sprayed material.

TABLE 12

| | |
|---|---|
| Anode type | 3969-1 (copper) |
| Voltage | 58-60 |
| Current, amps | 250 |
| Powder size | 44 microns and finer |
| Powder feed rate, gpm | 8 |
| Carrier gas | argon-5% $H_2$ |
| Carrier gas flow, cfh | 120 |
| Shroud gas | none |
| Shroud gas flow, cfh | — |
| Rotation speed, rpm | 2000 |

TABLE 13

| Segments | 1 | 2 | 3 |
|---|---|---|---|
| As-deposited density, % theoretical | 86.8 | 86.8 | 86.8 |
| Sintering temperature, °C | 1100 | 1150 | 1200 |
| Sintered density, % theoretical | 92.6 | 94.6 | 97.4 |
| DF, gm/cm³ | 0.107 | 0.144 | 0.196 |
| Absorbed energy to fracture, in-lb/in³ | 95 | 93 | 94 |
| Fracture stress, psi | 64,800 | 72,500 | 79,100 |
| Plastic elongation, % | 0.08 | 0.06 | 0.06 |

EXAMPLE 5

High purity beryllium powder, the chemical analysis of which is shown in Table 14, was plasma sprayed onto a 12-inch-diameter aluminum, disc, using an arc torch operating under the parameters shown in Table 15. The as-coated 12-inch-diameter disc, with a beryllium coating 0.5 inch thick, was cut into ½ inch by 4 inch strips and the coating thickness was reduced to 0.1 inch. the impurity property function was calculated as in Example 1 and found to be 23,000. As in Example 1, the properites of the segments as hereinafter used, will mean the average properties of two or more strips heat treated at the same temperature. Using the heat treatment procedure of Example 1, the strips were sintered at different temperatures ranging from 1100°C to 1200°C. As in Example 1, subsize sheet specimens were prepared and the absorbed energy to fracture value of the specimens was determined using the same instruments and conditions as recited in Example 1. The densification temperature, DF value, absorbed energy to fracture value, and other test data for each of the segments 1 through 3 are shown in Table 16. The data obtained from this test was used to plot curve II of FIG. 2, such curve containing the points within the triangles.

As illustrated in Table 16, densifying as deposited beryllium segments having an IPF value of 23,000, under the maximum IPF value of 25,000 as required by the process of this invention, produced beryllium materials having absorbed energy to fracture values from 265 to 551. Thus the requirement of a maximum IPF value of about 25,000 is demonstrated when the test results of Examples 4 and 5 are compared.

TABLE 14

| | |
|---|---|
| O* | 16,700 ppm |
| C | 800 ppm |
| Fe | 620 ppm |
| Al | 250 ppm |
| Mg | 750 ppm |
| Si | 200 ppm |

*Oxygen analysis of actual plasma-sprayed material.

TABLE 15

| | |
|---|---|
| Anode type | copper |
| Voltage | 60-62 |
| Current, amps | 205 |
| Powder size | 44 microns and finer |
| Powdered feed rate, gpm | 9 |
| Carrier gas | argon-5% $H_2$ |
| Carrier gas flow, cfh | 120 |
| Shroud gas | argon |
| Shroud gas flow, cfh | 1420 |
| Rotation speed, rpm | 2000 (approx.) |

TABLE 16

| Segments | 1 | 2 | 3 |
|---|---|---|---|
| As-deposited density % theoretical | 86.4 | 86.4 | 86.4 |
| Sintering temperature, °C | 1100 | 1150 | 1200 |
| Sintered density, % theroetical | 91.9 | 93.7 | 95.4 |
| DF, gm/cm³ | 0.102 | 0.135 | 0.166 |
| Absorbed energy to fracture, in-lb/in³ | 265 | 475 | 551 |
| Fracture stress, psi | 55,900 | 59,900 | 59,000 |
| Plastic elongation, % | 0.50 | 0.83 | 0.92 |

What is claimed is:

1. A process for making high energy absorption-porous plasma-consolidated beryllium material having an absorbed energy to fracture of at least 150 inch-lbs/inch$^3$ wherein said absorbed energy to fracture is the graphically integrated area under a stress-strain curve conducted to fracture, comprising the steps:

a. preparing an as-coated plasma-deposited beryllium material having a theoretical density between about 75 and about 97 percent based on a 100 percent theoretical density corrected for BeO content according to the formula:

$$\text{Theoretical Density} = \frac{100}{\frac{100 - \text{percent BeO}}{1.847} + \frac{\text{percent BeO}}{3.009}} \quad (\text{grams/cm.}^3).$$

an impurity-property function (IPF) of less than about 25,000 according to the formula:

$$IPF = 10.Al + 40.Si + 5.Mg + 0.5.(O+C)$$

wherein Al, Si, Mg, O, and C are the parts per million of aluminum, silicon, magnesium, oxygen and carbon in the as-coated material; and less than 1 percent by weight of metallic impurities other than those specified in the IPF formula; and b. densifying said beryllium article at a temperature sufficient to increase the density of said material by at least 0.04 grams/cm$^3$ while maintaining its theoretical density below 99 percent.

2. The process of claim 1 wherein the following step is added before step (b) as follows:

a. heating said beryllium article in a substantial vacuum to a temperature below its sintering temperature for a time period sufficient to substantially outgas and thermally desorb the gases and condensed gases occupying the pore surfaces of the material, respectively; and wherein the following step is added after step (b) as follows:

c. cooling said density increased material at a rate sufficient to react said beryllium with at least one of its impurities to form an intermetallic compound so that said impurities will not adversely affect the mechanical properties of the material at room temperature.

3. The process of claim 2 wherein in step (c) one of the impurities reacted with the beryllium is selected from a group consisting of aluminum and silicon.

4. The process as in claim 2 wherein the density of the as-coated plasma-deposited material is between about 80 and about 90 percent theoretical density.

5. The process as in claim 2 wherein in step (a') said beryllium material is heated below its sintering temperature for a period sufficient to decrease the as-coated adsorbed gas level of the material to below $10^{-4}$ moles per cubic centimeter of porosity.

6. The process of claim 2 wherein the step (a') said beryllium article is heated below its densification temperature at a rate less than about 10°C. per minute; in step (b) said beryllium article is densified at a temperature between about 650° and about 1250°C for a period between about 30 minutes and about 4 hours; and in step (c) said densified article is cooled to ambient at a rate between about 1° and about 10°C. per minute.

7. The process as in claim 2 wherein in step (a') said beryllium article is heated to about 500°C. and held thereat for a time period of at least 30 minutes.

8. The process as in claim 2 wherein in step (c) said densified article is cooled down to a temperature between about 500°C. and about 750°C. and held thereat for a period of at least 10 hours.

9. The process as in claim 6 wherein in step (a') said beryllium article is heated below its sintering temperature at a rate of about 4°C. per minute; and in step (c) said densified article is cooled at a rate between about 1.5° and about 2.0°C. per minute.

10. A high energy absorption-porous plasma consolidated beryllium material having a theoretical density between about 77 percent and about (99 percent) 96 percent based on a 100 percent theoretical density corrected for BeO content according to the formula:

$$\text{Theoretical Density} = \frac{100}{\frac{100 - \text{percent BeO}}{1.847} + \frac{\text{percent BeO}}{3.009}} \quad (\text{grams/cm.}^3).$$

an impurity-property function (IPF) of less than about 25,000 according to the formula:

$$IPF = 10.Al + 40.Si + 5.Mg + 0.5.(O+C)$$

wherein Al, Si, Mg, O, and C are the parts per million of aluminum, silicon, magnesium, oxygen and carbon in the beryllium material; other metallic impurities than those specified in the IPF formula of less than 1 percent by weight; and an absorbed energy to fracture of at least 150 inch-lbs/inch$^3$ wherein said absorbed energy to fracture is the graphically integrated area under a stress-strain curve conducted to fracture.

11. The material of claim 10 wherein the absorbed energy to fracture is at least 200 inch-lbs/inch$^3$.

* * * * *